UNITED STATES PATENT OFFICE.

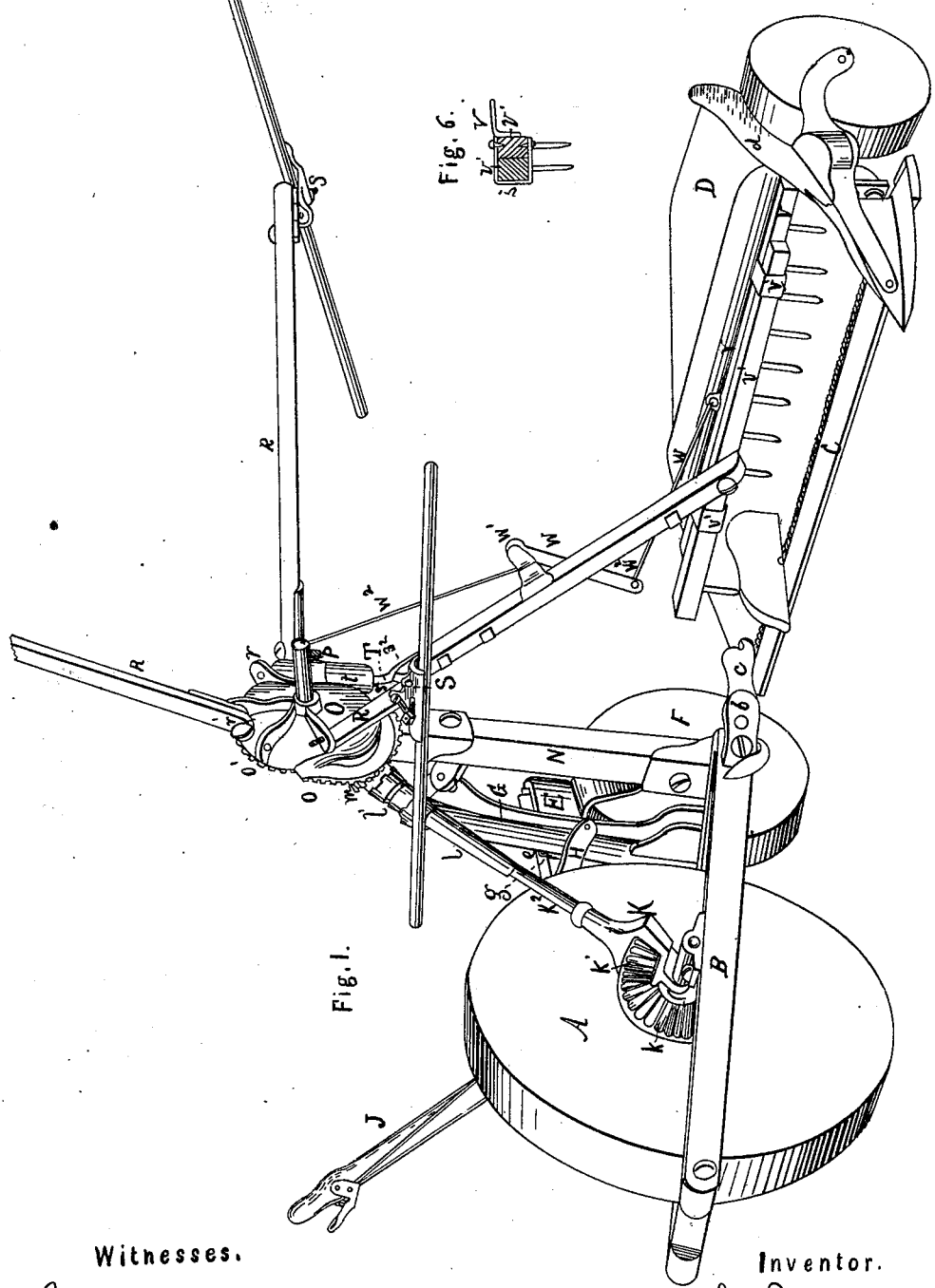

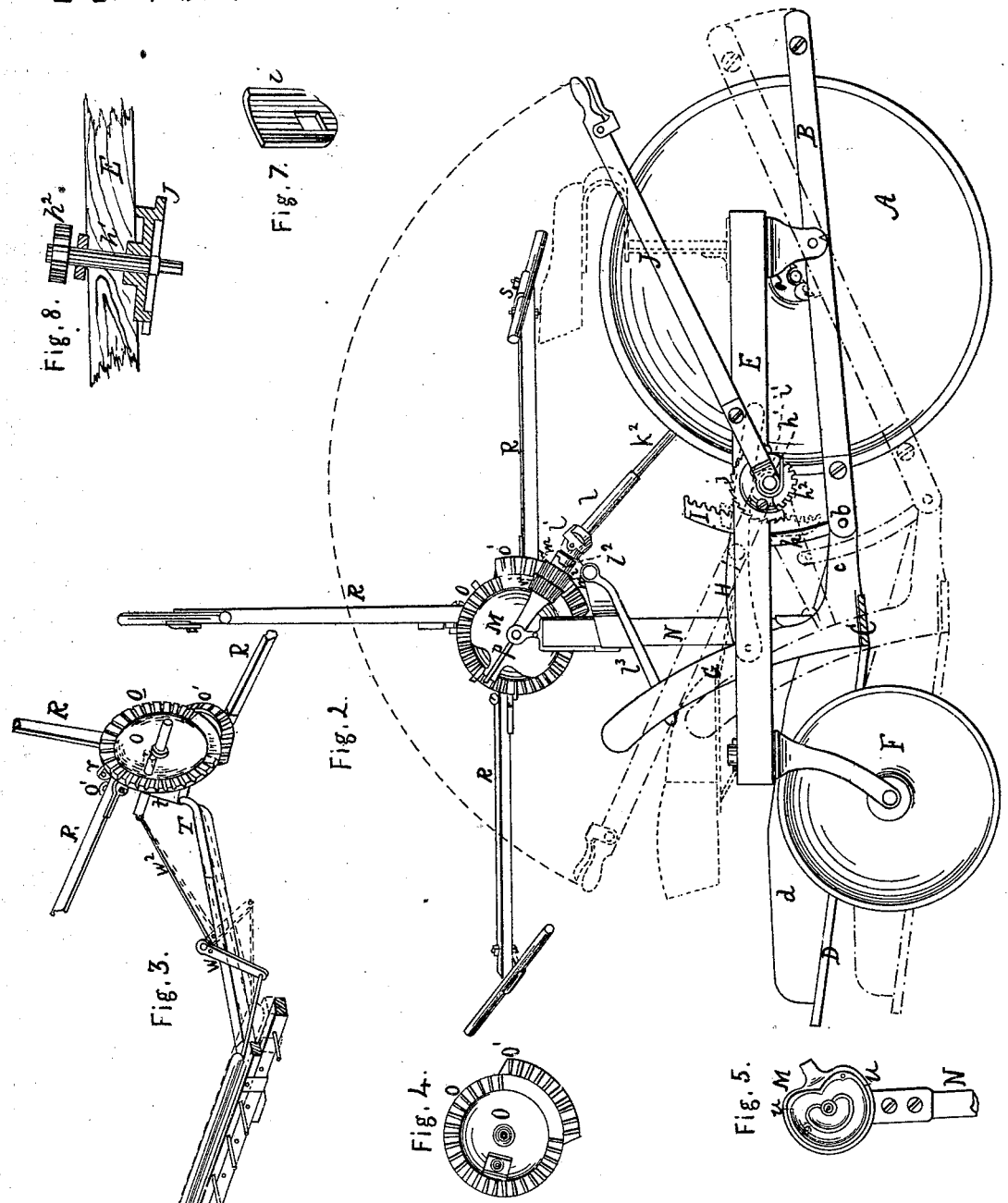

JOHN P. MANNY, OF ROCKFORD, ILLINOIS.

IMPROVEMENT IN HARVESTERS.

Specification forming part of Letters Patent No. 91,246, dated June 15, 1869.

*To all whom it may concern:*

Be it known that I, JOHN P. MANNY, of Rockford, in the county of Winnebago and State of Illinois, have invented certain new and useful Improvements in Harvesters, of which the following is a full, clear, and exact description.

First. The first branch of my invention relates to the harvester for which Letters Patent of the United States No. 34,761 were granted to me on the 25th day of March, 1862; and the improvement consists in a novel method, hereinafter described, of so combining and constructing the lifting-lever with the seat for the driver and for the raker that the cutting apparatus may be raised or lowered from either seat.

Second. The object of the next part of my invention is to allow the cutting apparatus to rise, to pass over inequalities in the ground, independently of the lifting-lever; and the improvement consists in a novel method, hereinafter described, of combining a lifting-lever, turning loosely on an oscillating shaft, carrying gearing, to operate the lifting devices, with a locking-plate keyed fast on said shaft, which locking-plate bears against the lifting-lever to prevent the descent of the cutting apparatus, but moves freely away from the lever when the cutting apparatus is raised by passing over an elevation of the ground.

Third. The object of the next part of my invention is to raise or lower the cutting apparatus with less muscular exertion than was required in my patent above mentioned; and the improvement consists in a novel method of combining a horizontal rock-shaft, operated by a hand-lever and carrying a pinion, with a toothed sector-rack mounted on a vibrating arm pivoted in front of the pinion-shaft, and from which arm the cutting apparatus is suspended by flexible connections, the lifting apparatus being all mounted on the main frame.

Fourth. The next part of my invention relates to devices for stopping and starting the rake; and the improvement consists in a novel method of combining the tumbling-shaft with a stationary shaft fixed on the rake-standard, and with an interposed sliding shaft having a clutch-coupling and a universal joint.

Fifth. The next part of the invention relates to that class of continuously-rotating combined rakes and reels revolving on an inclined axis. In rakes of this class I have discovered it to be essential that the rake, when sweeping the gavel from the platform, should travel more slowly than the speed with which the reel-arms ordinarily move. The object of the invention is to produce a slower movement of the rake and reel-arms during the discharge of the gavel from the platform; and the improvement consists in a novel method of combining a series of continuously-rotating reel-arms and a continuously-rotating rake with a revolving hub carrying gearing, a portion of which is outside of the plane of the bevel-wheel, in combination with pinions eccentrically arranged on the shaft which drives the rake.

Sixth. The improvement further consists in a novel method of diminishing the speed of the rake, when raking off, by means of pinions, at different distances from the reel-axis, driving segment-gears on the hub at different distances from the center.

Seventh. In a novel method of constructing the stationary disk, with a projecting flange or rib to support the gearing on the revolving hub.

Eighth. The object of the next part of the invention is to enable the rake to deliver the grain behind the driving-wheel by a circular horizontal movement over the platform; and the improvement consists in a novel method of mounting a continuously-rotating rake in a socket on a revolving hub, at right angles to the axis of said hub, in combination with a cam inside the hub, thus imparting an intermittent axial rocking or oscillating movement to the rake-shaft.

Ninth. The object of the next part of the invention is to move the grain endwise toward the stubble side of the machine while raking it from the platform; and the improvement consists in a novel method of combining with a continuously-rotating rake having an intermittent oscillating movement, as above described, a longitudinally-sliding rake-head, connected with the rake and reel-axle by link-connections mounted on the rake-arm.

Tenth. The object of the next part of the invention is to adjust the reel-beaters to the varying condition of the crop; and the improvement consists in combining reel-arms having a radial adjustment relatively to their axis with longitudinally-adjustable beaters pivoted to and adjustable in a plane parallel with the arms.

In the accompanying drawings I have represented all my improvements as embodied in a machine similar to that patented by me March 25, 1862. It is obvious, however, that some of my improvements may be used without the others, and they may also be adapted to machines differing in construction from the one herein described.

Figure 1 represents a view, in perspective, of my improved machine as seen from the divider side. Fig. 2 represents a view, in elevation, of the same as seen from the stubble side. Fig. 3 represents a view, in perspective, of the rake and its gearing. Fig. 4 represents a view, in elevation, of the segment-gears on the hub; Fig. 5, a view of the disk and its cam-track for turning the rake-head; Fig. 6, a transverse section through the rake-head; Fig. 7, a view, in perspective, of the locking-plate detached; and Fig. 8, a view of the lifting rock-shaft.

In this instance a driving-wheel, A, is shown as mounted on an axle, $a$, turning in suitable bearings in a main frame, B. A finger-beam, C, provided with lugs $c$, is hinged to the main frame by a pivot, $b$, which mode of connection admits of a slight rocking motion of the finger-beam. When reaping, a platform, D, provided with a fence or guard, $d$, is secured to the finger-beam in any proper well-known way. The finger-beam is also provided with a divider and grain-wheel, such as shown in my patent above mentioned.

A beam or frame, E, is pivoted at its forward end to the main frame in front of the axle of the driving-wheel, and is supported at its rear end by a caster-wheel, F. A curved arm or standard, G, secured to the stubble end of the finger-beam, slides up and down in a guide, $g$, on the beam E. A link, $h$, connects the joint-pin $b$ with an arm, H, vibrating vertically on a pivot, $h^1$, on the beam E.

The grain end of the machine is raised or lowered by a cord or chain attached to the rear end of the arm, as described in my patent aforesaid.

In order to carry out the first branch of my invention I mount a sector-rack, I, on the vibrating arm H, and arrange a pinion, $h^2$, on a rock-shaft mounted in suitable bearings on the beam E. A portion of this rock-shaft which projects on the stubble side of the beam E is made polygonal, and a locking-plate, $i'$, is keyed upon this polygonal portion of the shaft, so as to turn with it. (See Figs. 7 and 8.) A lifting-lever, J, turns freely on the rock-shaft, and is provided with a spring-detent of the usual well-known construction, taking into the notches of a rack, $j$.

The driver's seat is located above the axle of the driving wheel on the beam E, and the raker's-seat is mounted on the same beam over the caster-wheel, as in my patent aforesaid. These seats are shown in dotted lines in Fig. 2.

In this machine it is customary for the raker to drive the team from his seat as well as to rake off the grain. It therefore becomes important to adapt the lifting-lever to be operated from either position. This I do by removing the rocking plate and lifting-lever from the rock-shaft, setting the locking-plate backward or forward, as required, and then replacing the lifting-lever.

The locking-plate, it will be observed, is held on the polygonal portion of the shaft by the lifting-lever. To elevate the cutting apparatus, the attendant moves the lifting-lever forward until it strikes the flange of the locking-plate, which turns the rock-shaft and pinion, thus elevating the vibrating arm H, and with it the cutting apparatus. When, however, the finger-beam rises over an obstruction the link $h$ lifts the vibrating arm and sector, thus turning the rock-shaft and moving the locking-plate forward without moving the lifting-lever, which is held by its detent. The cutting apparatus is thus prevented from falling below a given point, while free to rise, to pass over inequalities in the ground.

A bevel-wheel, $k$, on the driving-axle, drives a bevel-pinion, $k^1$, on a counter-shaft, $k^2$, having its bearings in a yoke, K, inclosing both the pinions above mentioned, and pivoted on the main axle. This yoke serves the purposes both of holding the pinions securely in gear, while permitting the counter-shaft $k^2$ to oscillate vertically around the driving-axle to accommodate itself to the vertical vibrations of the rake.

A tubular shaft, $l$, slides endwise on and revolves with the counter-shaft $k^2$, and is connected by a universal joint, $l^1$, with a collar, $l^2$, turning freely on a stud-axle, $m$, on which it is capable of being moved freely endwise by a shipping-lever, $l^3$. An ordinary clutch connects this collar with two pinions, $m^1$ $m^2$, revolving on the stud-axle $m$, keyed fast on a stationary disk, M, mounted on a standard, N, secured upon an extension of the finger-beam, with its stubble side in about the same vertical plane as the divider side of the driving-wheel. This standard is, by preference, inclined slightly forward, so as, in a full-sized machine, to bring the reel-axis about eight inches in advance of the finger-beam, in order that the reel may gather the standing grain more effectually.

The shipper $l^3$, it will be observed, is mounted on the rake-post, and is so arranged as readily to be operated by a person riding upon the raker's seat.

The pinion $m^2$, it will be observed, while cast with the pinion $m^1$, is made eccentric to it, for a purpose hereinafter described.

The pinion $m^1$ gears into a segment of a bevel-wheel, $o$, mounted on a hub, O, revolving with an axle, P, rotating in bearings in the disk M. As this axle P might be bent by the strain on the gearing, I cast a flange or rib, $p$, on the disk M, on the side opposite the pinions $m^1 m^2$, with a projection which overhangs the segment-gear O, thus supporting the shaft P against lateral strain and preventing the slipping of the gears.

A bevel segment-gear, $o'$, is arranged opposite to, but at a greater distance from, its axis than the toothless space of the gear $o$. It is likewise curved inward in its central portion, so that its teeth are in a different vertical plane from those of the gear $o$, and its teeth mesh into those of the pinion $m^2$, for a purpose hereinafter described.

A series of reel-arms, R, is secured to flanges $r$ on the rotating hub O. These flanges, it will be observed, are arranged radially in relation to the axle P, and are nearly all arranged on one side of that axle. Radial notches on the flanges are clamped in corresponding notches on the rake-arms by means of set-screws, $r^1$, by which means the rake-arm may be set more or less perpendicularly relatively to the plane of rotation of the hub O, and thus vary the height of the beaters $R^1$.

The beaters are clamped in an open socket, S, by means of a set-screw working in a slot, $s$, which permits the beater to be adjusted endwise. The socket S is pivoted to oscillate vertically on a pivot, $s^2$, to adjust its angle of inclination relatively to the finger-beam, and is held at any desired angle by a curved slot and set-screw, $s^3$. The reel-beaters can thus be raised or lowered, moved in or out endwise, or tipped on their pivot, which secures a perfect adjustment relatively to the platform, to adapt the machine to the varying condition of the crop.

The rake-arm T oscillates in a socket, $t$, on the hub O, and carries a friction roller or stud, $u$, running in a cam-track, U, on the disk inside the hub.

To prevent the cut grain from being blown over the rake while being swept from the platform, and to secure more perfect delivery of the gavel, I arrange a horizontal ledge or flange, $v$, on the rake-head, which travels in advance of the rake when sweeping off the gavel.

In order to move the gavel endwise toward the grain side of the machine, and thus compress it while raking it from the platform, I arrange the rake-head V with loops $v'$, which permit it to slide freely endwise on a crosshead, V', fixed on the rake-arm.

The rake-head is reciprocated endwise by a link, $w$, connected at one end with the rake, and at the other with a lever, W, oscillating on a fulcrum, $w^1$, on the rake-arm. A link, $w^2$, is pivoted at one end, to the axle P, and at the other to the lever W, at a point near its fulcrum.

In operation the attendant can readily raise or lower the cutting apparatus to cut at different heights, and as both the cutting and raking mechanism are operated by gearing from the main axle, around which they vibrate, the harmonious co-operation of all the parts is secured.

The beaters press the standing grain back against the cutters, and lay it upon the platform in the usual way, when severed.

Just as the rake enters the standing grain, the outer segment, $o'$, gears into the eccentric-pinion $m^2$ on that side nearest the shaft, the effect of which is to diminish the speed of the rake and reel arms while the rake is sweeping over the platform. As the rake passes from the rear end of the platform, after discharging the gavel, the eccentric-pinion $m^2$ escapes from the rack $o'$ simultaneously with the engagement of the rack $o$ with the pinion $m$, and the rake and reel-beaters resume their ordinary speed.

The rack $o'$ might be made straight in its vertical section, instead of being curved; but I prefer the curved form, as by it the pinion and rack gear and ungear without the shocks or jerks incident to plane gears.

As the rake passes backward over the platform, the cam inside the hub oscillates the rake-shaft in its socket. The effect of this is to carry the lever W away from the axis P; but as this movement is restrained by the link $W^2$, the lower end of the lever W is vibrated toward the axis P, and the link $w$ draws the rake-head endwise, the effect of which is to compress the gavel, as well as to move it toward the rake-post, thus enabling me to use a smaller and lighter platform than would otherwise be necessary, as well as to secure a more perfect delivery of the gavel.

What I claim as my invention, and desire to secure by Letters Patent, is—

1. The lifting-lever constructed and arranged as described so as to be adjustable to be operated from either the driver's or raker's seat.

2. The combination of the rock-shaft, the locking-plate, and the lifting-lever, substantially as set forth.

3. The combination of the lifting-lever, the rock-shaft and its pinion, a sector-rack, and vibrating arm, all mounted on the main frame, with a finger-beam suspended by flexible connections from said frame, substantially as set forth.

4. The combination of the tumbling-shaft, the stationary shaft on the rake-standard, and the interposed sliding shaft and its clutch-coupling, arranged and operating substantially as set forth.

5. The combination, substantially as set forth, of rake and reel arms, revolving with a hub having its gearing in different vertical planes, with driving-pinions arranged eccentrically on their shaft to produce a slow motion of the rake and reel while the gavel is being swept from the platform.

6. The combination of a continuously-rotating rake, with bevel segment-gears on a revolving hub at different distances from the center, with driving-pinions likewise arranged at different distances from the center, substantially as described.

7. The combination of the stationary disk, carrying the pinion-shaft, with the projecting rib or flange overhanging the segment-gear, as set forth.

8. The combination of the rotating hub, the rake-shaft turning axially in its socket on the hub, and the fixed camway inside the hub with the guide traversing in the camway to oscillate the rake, all these parts being constructed for joint operation, substantially as set forth.

9. The combination of the continuously-rotating rake, having an intermittent oscillating movement with its rake-head, reciprocated longitudinally by link-connections mounted on the rake-arm and connected with the reel-axle, substantially as set forth.

10. The combination of the radially-adjustable reel-arms and the longitudinally-adjustable beaters with the oscillating socket S, substantially as set forth.

In testimony whereof I have hereunto subscribed my name.

JOHN P. MANNY.

Witnesses:
JOE I. PEYTON,
JOHN J. CHEW.